(12) United States Patent
Fang

(10) Patent No.: US 11,882,227 B2
(45) Date of Patent: Jan. 23, 2024

(54) BLOCKCHAIN-BASED CLOUD PLATFORM AUTHENTICATION METHOD, SYSTEM AND DEVICE AND MEDIUM

(71) Applicant: INSPUR SUZHOU INTELLIGENT TECHNOLOGY CO., LTD., Jiangsu (CN)

(72) Inventor: Bin Fang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/033,344

(22) PCT Filed: Jul. 30, 2021

(86) PCT No.: PCT/CN2021/109513
§ 371 (c)(1),
(2) Date: Apr. 23, 2023

(87) PCT Pub. No.: WO2022/083212
PCT Pub. Date: Apr. 28, 2022

(65) Prior Publication Data
US 2023/0291587 A1 Sep. 14, 2023

(30) Foreign Application Priority Data
Oct. 23, 2020 (CN) .......................... 202011148082.6

(51) Int. Cl.
*H04L 9/00* (2022.01)
*H04L 9/32* (2006.01)
(52) U.S. Cl.
CPC .............. *H04L 9/50* (2022.05); *H04L 9/3226* (2013.01); *H04L 9/3239* (2013.01); *H04L 9/3297* (2013.01)

(58) Field of Classification Search
CPC .. H04L 63/101; H04W 4/023; H04W 12/088; H04W 84/12
See application file for complete search history.

(56) References Cited

U.S. PATENT DOCUMENTS

2019/0305952 A1\* 10/2019 Hamel .................. H04L 9/0897
2019/0305964 A1\* 10/2019 Hamel .................. H04L 9/0891
(Continued)

FOREIGN PATENT DOCUMENTS

| CN | 101340282 A | 1/2009 |
|----|-------------|--------|
| CN | 104184743 A | 12/2014 |

(Continued)

*Primary Examiner* — Phy Anh T Vu
(74) *Attorney, Agent, or Firm* — IPro, PLLC

(57) ABSTRACT

A method for cloud-platform authentication based on blockchain includes: in response to a cloud platform being created, generating a random character string and performing hash operation to the character string to obtain a first hash value; in response to creation of a user in the cloud platform, performing operation to obtain a unique user ID; acquiring information of a hardware-authentication key, generating a unique authentication ID according to the information, and binding the unique user ID and the unique authentication ID; in response to the user being created in the cloud platform, generating a first password and a second password, performing operation to obtain a second hash value; and in response to the hardware-authentication key being inserted into the cloud platform, comparing the acquired information with the hash chain table, the unique authentication ID and the unique user ID stored in the cloud platform for the authentication.

20 Claims, 3 Drawing Sheets

(56) References Cited

U.S. PATENT DOCUMENTS

| | | | |
|---|---|---|---|
| 2019/0340607 A1* | 11/2019 | Lynn | G06Q 20/3678 |
| 2020/0044839 A1* | 2/2020 | Zhao | H04L 9/3236 |
| 2020/0045051 A1* | 2/2020 | Bathen | H04L 63/0428 |
| 2020/0169387 A1* | 5/2020 | Wei | G06F 21/6272 |
| 2020/0201964 A1* | 6/2020 | Nandakumar | H04L 63/123 |
| 2020/0389290 A1* | 12/2020 | Bathen | H04L 9/3213 |
| 2021/0141888 A1* | 5/2021 | Hires | H04L 9/3231 |
| 2021/0167962 A1* | 6/2021 | Wang | H04L 9/006 |
| 2022/0021528 A1* | 1/2022 | Dawson, III | H04L 9/0894 |
| 2022/0138791 A1* | 5/2022 | Dorward | H04L 63/12 |
| | | | 705/14.19 |
| 2023/0004423 A1* | 1/2023 | Fatahi | G06F 21/64 |
| 2023/0232222 A1* | 7/2023 | Ohashi | G06F 21/64 |
| | | | 455/411 |

FOREIGN PATENT DOCUMENTS

| | | |
|---|---|---|
| CN | 105071936 A | 11/2015 |
| CN | 106100836 A | 11/2016 |
| CN | 109446788 A | 3/2019 |
| CN | 111656732 A | 9/2020 |
| CN | 111680324 A | 9/2020 |
| CN | 112468301 A | 3/2021 |
| KR | 101918446 B1 | 1/2019 |
| WO | 2015055120 A1 | 4/2015 |
| WO | WO-2022154051 A1 * | 7/2022 |

* cited by examiner

BLOCKCHAIN-BASED CLOUD PLATFORM AUTHENTICATION METHOD, SYSTEM AND DEVICE AND MEDIUM

The present application claims the priority of the Chinese patent application filed on Oct. 23, 2020 before the China National Intellectual Property Administration with the application number of 202011148082.6 and the title of "BLOCKCHAIN-BASED CLOUD PLATFORM AUTHENTICATION METHOD, SYSTEM AND DEVICE AND MEDIUM", which is incorporated herein in its entirety by reference.

FIELD

The present disclosure relates to the technical field of authentication, and particularly relates to a method and system for cloud-platform authentication based on blockchain, a computer device and a readable medium.

BACKGROUND

With the development of technology, cloud platforms are managing increasingly more resources, and the safety of the cloud platforms is increasingly more important. Usually, the solution for improving the safety of a cloud platform is to increase the complexity of the passwords, and ensure the safety of the accounts of the cloud platform by increasing the difficulty in cracking the passwords. The consequent problem is the deterioration of the user experience, as the users are required to remember complicated passwords, and log in the cloud platform by using the correct passwords. With the increasing of the complexity of the passwords, the users increasingly easily erroneously remember or forget the passwords, and require applying to the administrator at intervals to reset the passwords, which increases the working load of the administrator, and deteriorates the usage experience of common users.

SUMMARY

In view of the above, an object of the embodiments of the present disclosure is to provide a method and system for cloud-platform authentication based on blockchain, a computer device and a computer-readable storage medium. By using a hardware-authentication key that ensures the validity and the uniqueness based on the blockchain technique, merely after the hardware-authentication key is inserted and the authentication succeeds, the cloud platform may be accessed, which ensures that the authentication data are valid and complete, and improves the usage experience of the user.

In order to achieve the above object, an aspect of the embodiments of the present disclosure provides a method for cloud-platform authentication based on blockchain, wherein the method includes:

in response to a cloud platform being created, generating a random character string and performing hash operation to the character string to obtain a first hash value;

in response to creation of a user in the cloud platform, based on current timestamp information and a username character string, performing operation to obtain a unique user identity document (ID);

acquiring information of a hardware-authentication key, generating a unique authentication ID according to the information, writing the unique authentication ID into the hardware-authentication key as a first ID, writing the unique user ID into the hardware-authentication key as a second ID, and binding the unique user ID and the unique authentication ID at the cloud platform;

in response to the user being created in the cloud platform, generating a first password and a second password, according to the first password and the first hash value, performing operation to obtain a second hash value, and writing a hash chain table including the first hash value and the second hash value into the hardware-authentication key; and in response to the hardware-authentication key being inserted into the cloud platform, acquiring the hash values in the hash chain table, the first ID and the second ID of the hardware-authentication key, and comparing with a final hash value in the hash chain table, the unique authentication ID and the unique user ID that are stored in the cloud platform respectively for authentication.

In some embodiments, the method further includes:

in response to the user modifying the first password into a third password, obtaining, by the cloud platform, a fourth password according to the third password; and performing operation to the second hash value and the second password to obtain a third hash value, performing operation to the third hash value and the third password to obtain a fourth hash value, and saving a hash chain table including the fourth hash value into the hardware-authentication key.

In some embodiments, the method further includes:

performing operation to an installation time, an installed-module list and an installation address of the cloud platform to obtain unique authentication information of the cloud platform.

In some embodiments, the method further includes:

writing the unique authentication information of the cloud platform into the hardware-authentication key, and associating the unique authentication information of the cloud platform with the unique authentication ID.

In some embodiments, the comparing with the final hash value in the hash chain table, the unique authentication ID and the unique user ID that are stored in the cloud platform respectively for authentication includes:

matching the acquired first ID in data stored in the cloud platform, and in response to the matching succeeding, determining whether the bound unique user ID exists in the first ID that is matched;

in response to the bound unique user ID existing, determining whether the unique user ID is the same as the acquired second ID; and in response to the unique user ID being different from the acquired second ID, stopping the authentication.

In some embodiments, the comparing with the final hash value in the hash chain table, the unique authentication ID and the unique user ID that are stored in the cloud platform respectively for authentication includes:

in response to the unique user ID being the same as the acquired second ID, according to the unique user ID, inquiring whether a state of the user is normal; and in response to the state of the user being abnormal, stopping the authentication.

In some embodiments, the comparing with the final hash value in the hash chain table, the unique authentication ID and the unique user ID that are stored in the cloud platform respectively for authentication includes:

in response to the state of the user being normal, inquiring whether a hash value of a next node of the first hash value is the same as the final hash value; and in response to the hash value of the next node of the first hash value being the same as the final hash value, passing the authentication, and giving a scope of logging-in according to a permission of the user.

Another aspect of the embodiments of the present disclosure further provides a system for cloud-platform authentication based on blockchain, wherein the system includes:

a first generating module configured for, in response to a cloud platform being created, generating a random character string and performing hash operation to the character string to obtain a first hash value;

a first operating module configured for, in response to creation of a user in the cloud platform, based on current timestamp information and a user-name character string, performing operation to obtain a unique user ID;

a second generating module configured for acquiring information of a hardware-authentication key, generating a unique authentication ID according to the information, writing the unique authentication ID into the hardware-authentication key as a first ID, writing the unique user ID into the hardware-authentication key as a second ID, and binding the unique user ID and the unique authentication ID at the cloud platform;

a second operating module configured for, in response to the user being created in the cloud platform, generating a first password and a second password, according to the first password and the first hash value, performing operation to obtain a second hash value, and writing a hash chain table including the first hash value and the second hash value into the hardware-authentication key; and an authenticating module configured for, in response to the hardware-authentication key being inserted into the cloud platform, acquiring the hash values in the hash chain table, the first ID and the second ID of the hardware-authentication key, and comparing with a final hash value in the hash chain table, the unique authentication ID and the unique user ID that are stored in the cloud platform respectively for authentication.

Yet another aspect of the embodiments of the present disclosure further provides a computer device, wherein the computer device includes:

at least one processor; and a memory, wherein the memory stores a computer instruction that is executable in the processor, and the instruction, when executed by the processor, implements the operations of the method stated above.

Still another aspect of the embodiments of the present disclosure further provides a computer-readable storage medium, wherein the computer-readable storage medium stores a computer program that, when executed by a processor, implements the operations of the method stated above.

The present disclosure has the following advantageous technical effect. By using a hardware-authentication key that ensures the validity and the uniqueness based on the blockchain technique, merely after the hardware-authentication key is inserted and the authentication has succeeded, the cloud platform may be accessed, which ensures that the authentication data are valid and complete, and improves the usage experience of the user.

BRIEF DESCRIPTION OF THE DRAWINGS

In order to more clearly illustrate the technical solutions of the embodiments of the present disclosure or the prior art, the figures that are required to describe the embodiments or the prior art will be briefly described below. Apparently, the figures that are described below are merely embodiments of the present disclosure, and a person skilled in the art may obtain other embodiments according to these figures without paying creative work.

DETAILED DESCRIPTION

In order to make the objects, the technical solutions and the advantages of the present disclosure clearer, the embodiments of the present disclosure will be further described in detail with reference to the particular embodiments and the drawings.

It should be noted that all of the expressions using "first" and "second" in the embodiments of the present disclosure are intended to distinguish two different entities or different parameters that have the same names. It can be seen that "first" and "second" are merely for the convenience of the expression, and should not be construed as a limitation on the embodiments of the present disclosure, which will not be explained in detail in the subsequent embodiments.

Figure 1:
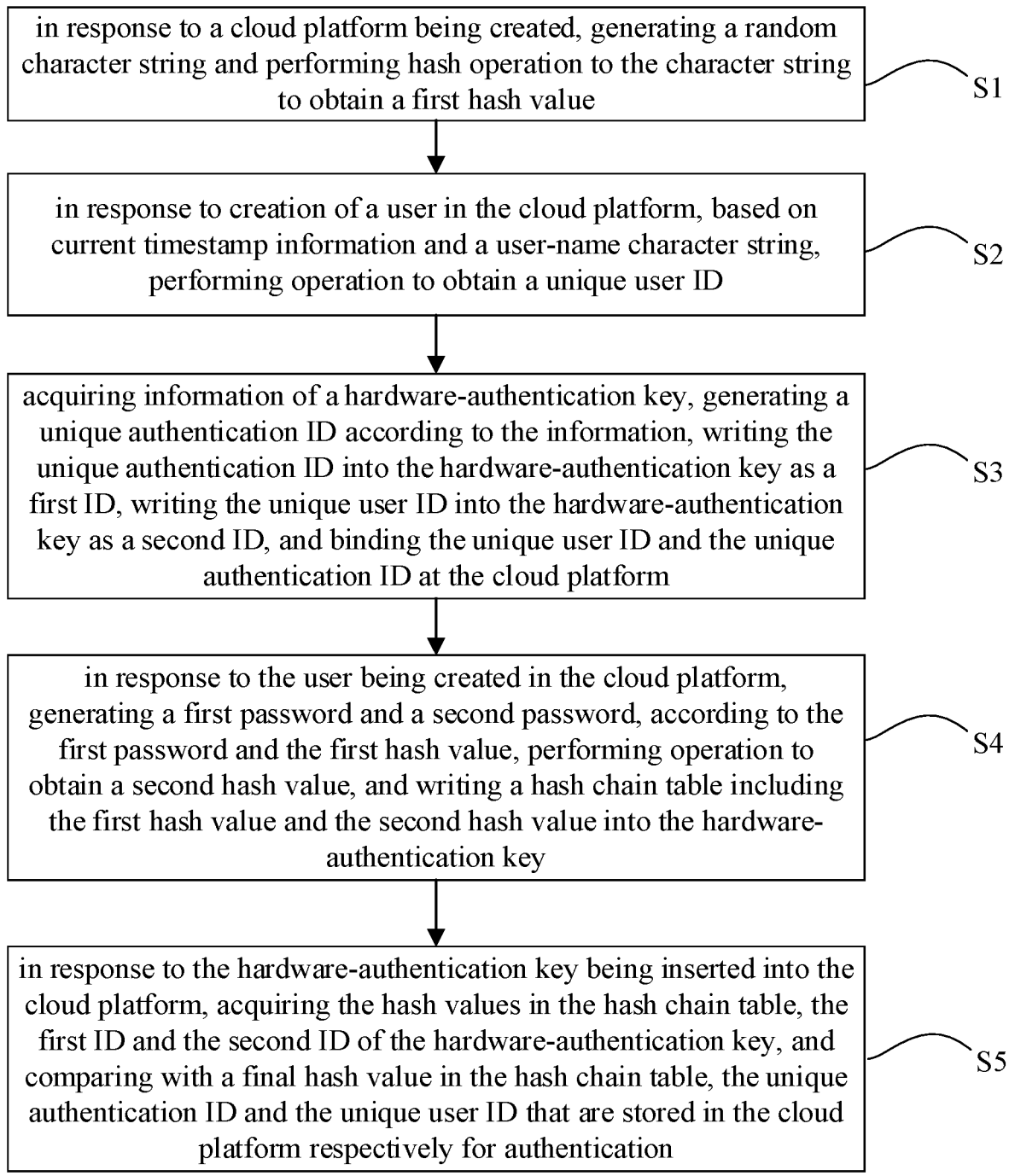
FIG. 1 is a schematic diagram of an embodiment of a method for cloud-platform authentication based on blockchain according to the present disclosure.

In order to achieve the above object, the first aspect of the embodiments of the present disclosure provides the embodiments of a method for cloud-platform authentication based on blockchain. FIG. 1 shows a schematic diagram of an embodiment of a method for cloud-platform authentication based on blockchain according to the present disclosure. As shown in FIG. 1, the embodiment of the present disclosure includes the following operations:

S1: in response to a cloud platform being created, generating a random character string and performing hash operation to the character string to obtain a first hash value;

S2: in response to creation of a user in the cloud platform, based on current timestamp information and a user-name character string, performing operation to obtain a unique user ID;

S3: acquiring information of a hardware-authentication key, generating a unique authentication ID according to the information, writing the unique authentication ID into the hardware-authentication key as a first ID, writing the unique user ID into the hardware-authentication key as a second ID, and binding the unique user ID and the unique authentication ID at the cloud platform;

S4: in response to the user being created in the cloud platform, generating a first password and a second password, according to the first password and the first hash value, performing operation to obtain a second hash value, and writing a hash chain table including the first hash value and the second hash value into the hardware-authentication key; and S5: in response to the hardware-authentication key being inserted into the cloud platform, acquiring the hash values in the hash chain table, the first ID and the second ID of the hardware-authentication key, and comparing with a final hash value in the hash chain table, the unique authentication ID and the unique user ID that are stored in the cloud platform respectively for authentication.

The hardware-authentication key according to the embodiments of the present disclosure may be a USB-flash-disk-type hardware-authentication key (key). Its basic structure is a USB (Universal Serial Bus) port device, and in the device, there exists an apparatus that may store data. The contents of the stored data are the unique identifier of the cloud platform, the user ID (serial number), the uniqueness ID of the hardware-authentication key, and the permission-authentication information. The USB flash disk is a hard-encrypted-type USB flash disk, and the USB flash disks given to common users are read-only USB flash disks, are merely used for data reading, and may not modify the data, to ensure the data validity. Merely the dispenser of the USB-flash-disks-type hardware-authentication key has the permission of writing data into the USB flash disks, to initialize the authentication data. Usually, the first ID in the hardware-authentication key is the unique authentication ID, and the second ID is the unique user ID.

The VID&PID, the serial number, the manufacturer information, the product information and the version information of the USB flash disk are read, and are connected by using hyphens, to obtain the unique character string, which undergoes md5-value operation, to obtain a uniqueness-ID character string, to identify the uniqueness ID of the USB-flash-disks-type hardware-authentication key ID.

In some embodiments, the method further includes: performing operation to an installation time, an installed-module list and an installation address of the cloud platform to obtain unique authentication information of the cloud platform. The unique authentication information of the cloud platform is the identifier of the uniqueness of the cloud-platform authentication. The installation time of the cloud platform (year-month-day, with the format of XXXX-XX-XX), the information on the installed-module list of the cloud platform (according to the requirements by different services, different modules may be selected to be installed to the cloud platform, the information format is the module names, and the multiple module names are connected by hyphens, for example, authentication-permission-report . . . ) and the information of the MAC address of the cloud-platform-installed system are connected by the hyphens to obtain a character string. Subsequently, md5-value operation is performed to the character string, to obtain a uniqueness-authentication-information character string of the cloud platform. Such a character string, because of the uniqueness of the installation time, the modules and the system MAC information of the cloud platform, may ensure the uniqueness of the information character string, thereby ensuring the uniqueness of the uniqueness-authentication information of the cloud platform.

In some embodiments, the method further includes: writing the unique authentication information of the cloud platform into the hardware-authentication key, and associating the unique authentication information of the cloud platform with the unique authentication ID.

In response to the cloud platform being created, a random character string is generated and the hash operation is performed to the character string to obtain a first hash value.

In response to the creation of a user in the cloud platform, based on current timestamp information and a user-name character string, the operation is performed to obtain a unique user ID. The user ID of the newly created user in the cloud platform employs a 32-bit character-string identifier, and the rule of generating the character string includes: obtaining a character string of the timestamp information of the current system time of the cloud platform plus the user name, performing the md5 operation, and subsequently operating out the 32-bit character string. Because the time stamp of the system time of the cloud platform is always increasing, and the cloud platform checks the user name when newly creating a user with the rule that the user names in the cloud platform must be unique, that may ensure the uniqueness of the operated character string. The md5-value character string is operated out according to the uniqueness character string, to ensure the uniqueness of the user ID.

The information of a hardware-authentication key is acquired, a unique authentication ID is generated according to the information, the unique user ID is written into the hardware-authentication key, and the unique user ID and the unique authentication ID are bound. The users and the hardware-authentication keys in the cloud platform correspond one to one; in other words, each of the users has merely one hardware-authentication key. The permission-authentication logic in the cloud platform is to, according to the hardware-authentication key, mark the range of the resource that the currently authentication key may access.

In response to the user being created in the cloud platform, a first password and a second password are generated, according to the first password and the first hash value, operation is performed to obtain a second hash value, and a hash chain table including the first hash value and the second hash value is written into the hardware-authentication key. After the user of the cloud platform being created, two passwords, a password 1 and a password 2, are automatically generated. The password 1 is connected to the first hash value (the hash value 1) by a hyphen, for example, (password 1-hash value 1), to obtain the character string, and the character string is operated to obtain the hash value 2. Likewise, the password 2 is connected to the hash value 2 by a hyphen, for example, (password 2-hash value 2), to obtain the character string, and the character string is operated to obtain the hash value 3. The password hash chain-table datum stored by the user is (hash value 1, password 1)→ (hash value 2, password 2). The password 1 is the current password of the user. Because the hash value 2 is obtained by performing operation according to the password 1 and the hash value 1, that ensures the correctness of the password 1.

In response to the hardware-authentication key being inserted into the cloud platform, the hash values, the first ID and the second ID in the hardware-authentication key are acquired, and are compared with the final hash value, the unique authentication ID and the unique user ID that are stored in the cloud platform respectively for the authentication.

In some embodiments, the method further includes: in response to the user modifying the first password into a third password, obtaining, by the cloud platform, a fourth password according to the third password; and performing operation to the second hash value and the second password to obtain a third hash value, performing operation to the third hash value with the third password to obtain a fourth hash value, and saving a hash chain table including the fourth hash value into the hardware-authentication key.

After the user modifying the password, the cloud platform automatically creates a password 3 and a password 4, and the password hash chain-table datum stored by the user is (hash value 1, password 1)→(hash value 2, password 2)→(hash value 3, password 3)→(hash value 4, password 4). The new password of the user is the password 3. According to the hash value 3 and the hash value 4, the correctness of the password 3 may be ensured, because when the password 3 is erroneous, the hash operation may not be performed according to the algorithm to obtain the same hash value 4, thereby ensuring the correctness of the password 3. According to the hash value 2 and the password 2, the correctness of the hash value 3 may be ensured. According to the characteristic of the hash chain table, by using the hash value 1 and the hash value 4, the correctness of the data of the entire user-password hash chain table may be ensured. In the chain table, the modification on the datum of a certain intermediate node results in the inconsistency between the final hash value operated out from the entire chain table and the hash value 4.

In some embodiments, the operation of comparing with the final hash value in the hash chain table, the unique authentication ID and the unique user ID that are stored in the cloud platform respectively for authentication includes: matching the acquired first ID in data stored in the cloud platform, and in response to the matching succeeding, determining whether the bound unique user ID exists in the first ID that is matched; in response to the bound unique user ID existing, determining whether the unique user ID is the same as the acquired second ID; and in response to the unique user ID being different from the acquired second ID of the user, stopping the authentication.

The states of the hardware-authentication key include three states: normal-state, loss reporting state and logout state. When in the loss reporting state and the logout state, the hardware-authentication key may not be identified as a valid hardware-authentication key, and the cloud platform may not be logged in by using that hardware-authentication key. The hardware-authentication key may not be identified as a valid hardware-authentication key, and the cloud platform may not be logged in by using that hardware-authentication key. When a user is registering a hardware-authentication key, the situation of the registration of the hardware-authentication key in the cloud platform is checked according to the uniqueness ID of the hardware-authentication key, and merely a hardware-authentication key that is not registered may be registered to the current user, which ensures that the users and the hardware-authentication keys are of a one-to-one correspondence relation therebetween. The user is merely supported to bind one hardware-authentication key, and when the user is bound to a hardware-authentication key previously, the user is required to firstly be unbound from the hardware-authentication key, and then the user may subsequently bind the current hardware-authentication key.

In some embodiments, the operation of comparing with the final hash value in the hash chain table, the unique authentication ID and the unique user ID that are stored in the cloud platform respectively for authentication includes: in response to the unique user ID being the same as the acquired second ID, according to the unique user ID, inquiring whether a state of the user is normal; and in response to the state of the user being abnormal, stopping the authentication.

The state of the user includes normal-state, locked state and deleted state. In the present embodiment, the locked state and the deleted state are collectively referred to as "abnormal". When the user is in the locked state, the user may not log in the cloud platform, and may not manipulate the resource in the cloud platform. The deleted state represents that the user does not exist. All of the user names of all of the states in the cloud platform are unique, to ensure the uniqueness of the user IDs.

In some embodiments, the operation of comparing with the final hash value in the hash chain table, the unique authentication ID and the unique user ID that are stored in the cloud platform respectively for authentication includes: in response to the state of the user being normal, inquiring whether a hash value of a next node of the first hash value is the same as the final hash value; and in response to the hash value of the next node of the first hash value being the same as the final hash value, passing the authentication, and giving a scope of logging-in according to a permission of the user.

The following is the whole process of the authentication:
1: reading the data of the hardware-authentication key, to acquire the following data: the unique identifier of the cloud platform, the user ID, the uniqueness ID of the hardware-authentication key, and the permission-authentication information;
2: comparing the unique identifier of the cloud platform with the unique authentication information of the cloud platform stored in the cloud platform, wherein when the data are consistent, that indicates that the authentication key is the authentication key of the cloud platform;
3: according to the uniqueness ID of the hardware-authentication key, inquiring the bound user ID, and confirming that the hardware-authentication key is bound to the user, and when the user ID is not inquired, then identifying the hardware-authentication key to be invalid; and inquiring according to the user ID, wherein when the user ID exists, and the state of the user is the normal-state, that indicates that the user is a normal user;
4: reading the permission-authentication information, to acquire the authentication-information hash value 1 and the authentication-information hash value 2, wherein when the chain-table node may be inquired in the authentication chain table of the user according to the authentication-information hash value 1, that indicates that the authentication-information hash value 1 is valid, and subsequently inquiring the next node of the chain table, to acquire the hash value 1 of the next node, wherein when the authentication-information hash value 2 is consistent with the hash value 1 of the next node, that indicates that the authentication-information hash value 2 is valid;
5: when all of the above authentication pass, then determining that the current hardware-authentication key is a valid key;
6: logging in the cloud platform, and, by the cloud platform, according to the hardware-authentication key, inquiring the permission corresponding to the user; and
7: by the cloud platform, inquiring the hardware-authentication key every two seconds, once the information of the hardware-authentication key may not be inquired, then considering that the hardware-authentication key is removed from the accessing client, and generally the user operation is removing the USB-flash-disks-type hardware-authentication key, and accordingly, by the cloud platform, automatically skipping to the logging-in page.

The present disclosure provides a method for cloud-platform authentication by using a hardware-authentication key, which, by using the blockchain technique, may ensure the validity of the hardware-authentication key. Moreover, based on the blockchain technique, the modification on the password by the user does not result in the invalidity of the hardware-authentication key, and as long as the password may pass all of the operations of the permission verification, and pass the data checking by the core technology hash chain table of the blockchain, the validity of the hardware-authentication key may be checked. Moreover, the user may be provided two modes of the logging-in of the cloud platform, wherein the user may not only log in the cloud platform by using the modified password, but also may log in the cloud platform by using the hardware-authentication key. While ensuring the safety of the accessing by the user, the present disclosure provides a convenient mode for authenticating the cloud platform to the user, which improves the usage experience of the user, increases the usage stickiness of the user, and enhances the product power of the cloud platform.

It should be particularly noted that all of the operations according to the embodiments of the method for cloud-platform authentication based on blockchain stated above may be mutually mixed, replaced, added and deleted. Therefore, those reasonable arrangements, combinations and variations of the method for cloud-platform authentication based on blockchain should also fall within the protection scope of the present disclosure, and the protection scope of the present disclosure should not be limited to the embodiments.

Figure 2:
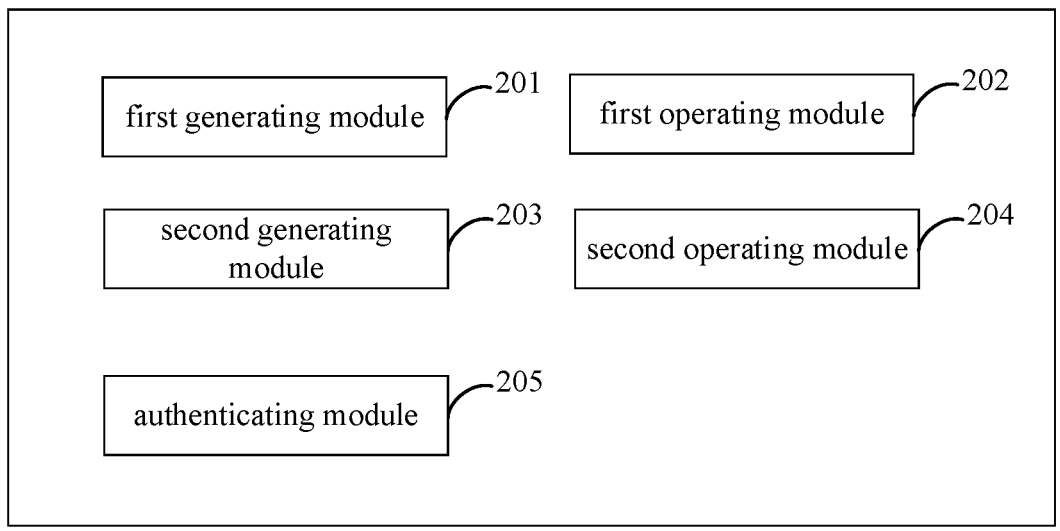
FIG. 2 is a schematic diagram of an embodiment of a system for cloud-platform authentication based on blockchain according to the present disclosure.

In order to achieve the above object, the second aspect of the embodiments of the present disclosure provides a system for cloud-platform authentication based on blockchain. FIG. 2 shows a schematic diagram of an embodiment of a system for cloud-platform authentication based on blockchain according to the present disclosure. As shown in FIG. 2, the system for cloud-platform authentication based on blockchain according to the embodiment of the present disclosure includes:

a first generating module 201 configured for, in response to a cloud platform being created, generating a random character string and performing hash operation to the character string to obtain a first hash value;

a first operating module 202 configured for, in response to creation of a user in the cloud platform, based on current timestamp information and a user-name character string, performing operation to obtain a unique user ID;

a second generating module 203 configured for acquiring information of a hardware-authentication key, generating a unique authentication ID according to the information, writing the unique authentication ID into the hardware-authentication key as a first ID, writing the unique user ID into the hardware-authentication key as a second ID, and binding the unique user ID and the unique authentication ID at the cloud platform;

a second operating module 204 configured for, in response to the user being created in the cloud platform, generating a first password and a second password, according to the first password and the first hash value, performing operation to obtain a second hash value, and writing a hash chain table including the first hash value and the second hash value into the hardware-authentication key; and an authenticating module 205 configured for, in response to the hardware-authentication key being inserted into the cloud platform, acquiring the hash values in the hash chain table, the first ID and the second ID of the hardware-authentication key, and comparing with a final hash value in the hash chain table, the unique authentication ID and the unique user ID that are stored in the cloud platform respectively for authentication.

In some embodiments, the system further includes:

a modifying module configured for, in response to the user modifying the first password into a third password, obtaining, by the cloud platform, a fourth password according to the third password; and performing operation to the second hash value and the second password to obtain a third hash value, performing operation to the third hash value and the third password to obtain a fourth hash value, and saving a hash chain table including the fourth hash value into the hardware-authentication key.

In some embodiments, the system further includes:

a third operating module configured for performing operation to an installation time, an installed-module list and an installation address of the cloud platform to obtain unique authentication information of the cloud platform.

In some embodiments, the system further includes:

a writing-in module configured for writing the unique authentication information of the cloud platform into the hardware-authentication key, and associating the unique authentication information of the cloud platform with the unique authentication ID.

In some embodiments, the authenticating module is configured for:

matching the acquired first ID in data stored in the cloud platform, and in response to the matching succeeding, determining whether the bound unique user ID exists in the first ID that is matched;

in response to the bound unique user ID existing, determining whether the unique user ID is the same as the acquired second ID; and in response to the unique user ID being different from the acquired second ID, stopping the authentication.

In some embodiments, the authenticating module is configured for:

in response to the unique user ID being the same as the acquired second ID, according to the unique user ID, inquiring whether a state of the user is normal; and in response to the state of the user being abnormal, stopping the authentication.

In some embodiments, the authenticating module is configured for:

in response to the state of the user being normal, inquiring whether a hash value of a next node of the first hash value is the same as the final hash value; and in response to the hash value of the next node of the first hash value being the same as the final hash value, passing the authentication, and giving a scope of logging-in according to a permission of the user.

In order to achieve the above object, the third aspect of the embodiments of the present disclosure provides a computer device, wherein the computer device includes:

at least one processor; and a memory, wherein the memory stores a computer instruction that is executable in the processor, and the instruction, when executed by the processor, implements the operations of:

S1: in response to a cloud platform being created, generating a random character string and performing hash operation to the character string to obtain a first hash value;

S2: in response to creation of a user in the cloud platform, based on current timestamp information and a username character string, performing operation to obtain a unique user ID;

S3: acquiring information of a hardware-authentication key, generating a unique authentication ID according to the information, writing the unique authentication ID into the hardware-authentication key as a first ID, writing the unique user ID into the hardware-authentication key as a second ID, and binding the unique user ID and the unique authentication ID at the cloud platform;

S4: in response to the user being created in the cloud platform, generating a first password and a second password, according to the first password and the first hash value, performing operation to obtain a second hash value, and writing the second hash value into the hardware-authentication key as the final hash value; and S5: in response to the hardware-authentication key being inserted into the cloud platform, acquiring the hash values in the hash chain table, the first ID and the second ID of the hardware-authentication key, and comparing with the final hash value, the unique authentication ID and the unique user ID that are stored in the cloud platform respectively for the authentication.

In some embodiments, the operations further include: in response to the user modifying the first password into a third password, obtaining, by the cloud platform, a fourth password according to the third password; and performing operation to the second hash value with the second password to obtain a third hash value, performing operation to the third hash value with the third password to obtain a fourth hash value, and saving a hash chain table including the fourth hash value into the hardware-authentication key.

In some embodiments, the operations further include: performing operation to an installation time, an installed-module list and an installation address of the cloud platform to obtain unique authentication information of the cloud platform.

In some embodiments, the operations further include: writing the unique authentication information of the cloud platform into the hardware-authentication key, and associating the unique authentication information of the cloud platform with the unique authentication ID.

In some embodiments, the operation of comparing with the final hash value in the hash chain table, the unique authentication ID and the unique user ID that are stored in the cloud platform respectively for authentication includes: matching the acquired first ID in data stored in the cloud platform, and in response to the matching succeeding, determining whether the bound unique user ID exists in the first ID that is matched; in response to the bound unique user ID existing, determining whether the unique user ID is the same as the acquired second ID; and in response to the unique user ID being different from the acquired second ID, stopping the authentication.

In some embodiments, the operation of comparing with the final hash value in the hash chain table, the unique authentication ID and the unique user ID that are stored in the cloud platform respectively for authentication includes: in response to the unique user ID being the same as the acquired second ID, according to the unique user ID, inquiring whether a state of the user is normal; and in response to the state of the user being abnormal, stopping the authentication.

In some embodiments, the operation of comparing with the final hash value in the hash chain table, the unique authentication ID and the unique user ID that are stored in the cloud platform respectively for authentication includes: in response to the state of the user being normal, inquiring whether a hash value of a next node of the first hash value is the same as the final hash value; and in response to the hash value of the next node of the first hash value being the same as the final hash value, passing the authentication, and giving a scope of logging-in according to a permission of the user.

Figure 3:
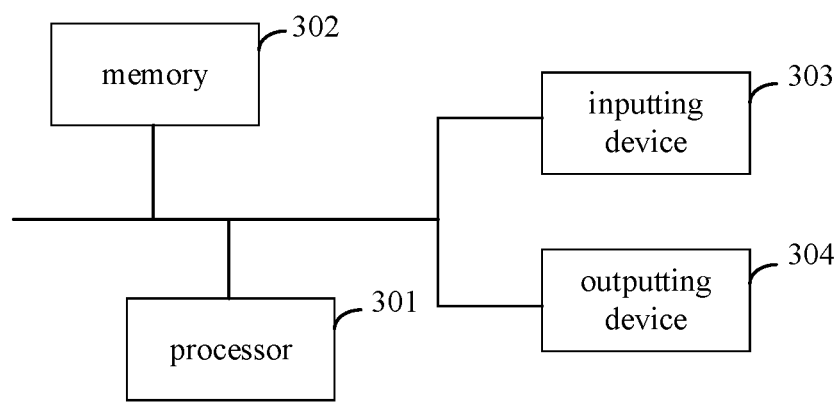
FIG. 3 is a schematic diagram of the hardware structure of an embodiment of a computer device for cloud-platform authentication based on blockchain according to the present disclosure.

As shown in FIG. 3, FIG. 3 is a schematic diagram of the hardware structure of an embodiment of a computer device for cloud-platform authentication based on blockchain according to the present disclosure.

Taking the device shown in FIG. 3 as an example, the device includes a processor 301 and a memory 302, and may further include an inputting device 303 and an outputting device 304.

The processor 301, the memory 302, the inputting device 303 and the outputting device 304 may be connected by a bus or in another manner, and FIG. 3 illustrates by taking connection by a bus as an example.

The memory 302, as a non-transitory computer-readable storage medium, may be used to store a non-volatile software program, a non-volatile computer-executable program and a module, for example, the program instruction/module corresponding to the method for cloud-platform authentication based on blockchain according to the embodiments of the present application. The processor 301, by executing the non-transitory software program, instruction and module stored in the memory 302, executes the various functional applications and data processing of the server, i.e., implementing the method for cloud-platform authentication based on blockchain according to the above process embodiments.

The memory 302 may include a program storing region and a data storing region. The program storing region may store application programs required by the operating system and at least one function. The data storing region may store the data, and so on, created by the usage of the method for cloud-platform authentication based on blockchain. Furthermore, the memory 302 may include a high-speed random access memory, and may also include a non-transitory memory, for example, at least one magnetic-disk storage device, flash-memory device or another non-volatile solid-state memory device. In some embodiments, the memory 302 may be a memory provided remotely to the processor 301, and the remote memory may be connected to a local module via a network. Examples of the network include but are not limited to the Internet, an enterprise intranet, a local area network, a mobile communication net and a combination thereof.

The inputting device 303 may receive information such as the inputted user name and password. The outputting device 304 may include a displaying device such as a display screen.

One or more program instructions/modules corresponding to the method for cloud-platform authentication based on blockchain are stored in the memory 302, and, when executed by the processor 301, implement the method for cloud-platform authentication based on blockchain according to any of the above process embodiments.

Any one of the embodiments of the computer device that implements the method for cloud-platform authentication based on blockchain stated above may reach an effect the same as or similar to those of any of the above-described process embodiments corresponding thereto.

Figure 4:
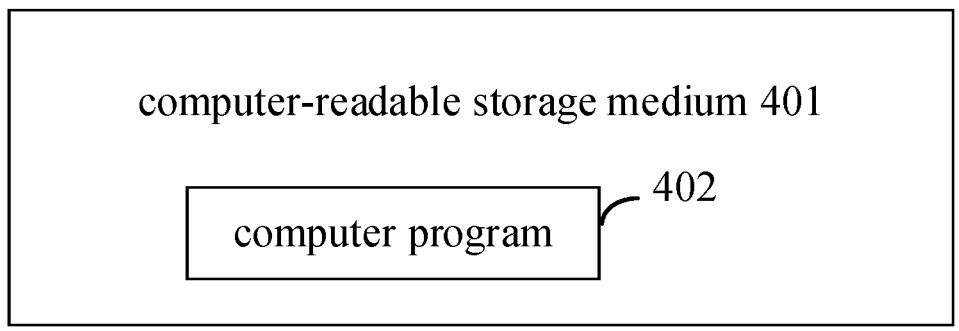
FIG. 4 is a schematic diagram of an embodiment of a computer-readable storage medium according to the present disclosure.

The present disclosure further provides a computer-readable storage medium, wherein the computer-readable storage medium stores a computer program that, when executed by a processor, implements the method stated above. FIG. 4 shows a schematic diagram of an embodiment of a computer-readable storage medium according to the present disclosure. As shown in FIG. 4, the computer-readable storage medium 401 according to the embodiment of the present disclosure stores a computer program 402.

Finally, it should be noted that a person skilled in the art may understand that all or some of the processes of the methods according to the above embodiments may be implemented by relative hardware according to an instruction from a computer program, the program of the method for cloud-platform authentication based on blockchain may be stored in a computer-readable storage medium, and the program, when executed, may include the processes of the embodiments of the method stated above. The storage medium of the program may be a diskette, an optical disk, a Read-Only Memory (ROM), a Random Access Memory (RAM) and so on. The embodiments of the computer program may reach an effect the same as or similar to those of any of the above-described process embodiments corresponding thereto.

The illustrative embodiments disclosed by the present disclosure are described above. However, it should be noted that many variations and modifications may be made without departing from the scope of the embodiments of the present disclosure defined by the claims. The functions, steps and/or acts of the process claims according to the disclosed embodiments described herein are not required to be implemented in any specific sequence. Furthermore, although the elements of the embodiments of the present disclosure may be described or claimed in a singular form, unless explicitly limited as singular, they may also be comprehended as plural.

It should be understood that, as used herein, unless the context clearly supports an exception, the singular form "a" is intended to encompass a plural form. It should also be understood that, as used herein, the "and/or" refers to including any and all feasible combinations of one or more relatively listed items.

The serial numbers of the embodiments of the present disclosure are merely for the purpose of description, and do not indicate the relative preferences of the embodiments.

A person skilled in the art may understand that all or some of the steps for implementing the above embodiments may be completed by hardware, and may also be completed by using a program to instruct relevant hardware. The program may be stored in a computer-readable storage medium. The above-mentioned storage medium may be a read-only memory, a magnetic disk, an optical disk and so on.

A person skilled in the art should understand that the discussion on any of the above embodiments is merely illustrative, and are not intended to imply that the scope (including the claims) of the embodiments of the present disclosure is limited to those examples. With the concept of the embodiments of the present disclosure, the embodiments or the technical features of different embodiments may be combined, and many other variations of different aspects of the embodiments of the present disclosure as stated above may exist, which are not provided in detail for brevity. Therefore, any omissions, modifications, equivalent substitutions and improvements that are made within the spirit and the principle of the embodiments of the present disclosure should fall within the protection scope of the embodiments of the present disclosure.

The invention claimed is:

1. A method for cloud-platform authentication based on blockchain, wherein the method comprises:
   in response to a cloud platform being created, generating a random character string and performing hash operation to the random character string to obtain a first hash value;
   in response to creation of a user in the cloud platform, based on current timestamp information and a username character string, performing operation to obtain a unique user identity document (ID);
   acquiring information of a hardware-authentication key, generating a unique authentication ID according to the information, writing the unique authentication ID into the hardware-authentication key as a first ID, writing the unique user ID into the hardware-authentication key as a second ID, and binding the unique user ID and the unique authentication ID at the cloud platform;
   in response to completion of the creation of the user in the cloud platform, generating a first password and a second password; performing operation to obtain a second hash value based on the first password and the first hash value, and writing a hash chain table including the first hash value and the second hash value into the hardware-authentication key;
   in response to the hardware-authentication key being inserted into the cloud platform, acquiring the hash values in the hash chain table, the first ID and the second ID of the hardware-authentication key, and comparing with a final hash value in the hash chain table, the unique authentication ID and the unique user ID that are stored in the cloud platform respectively for authentication;
   in response to the authentication being passed, giving a scope of logging-in according to a permission of the user; and
   in response to the authentication being not passed, not allowing to loci in the cloud platform.

2. The method according to claim 1, wherein the method further comprises:
   in response to the user modifying the first password into a third password, obtaining, by the cloud platform, a fourth password according to the third password; and
   performing operation to the second hash value and the second password to obtain a third hash value, performing operation to the third hash value and the third password to obtain a fourth hash value, and saving the hash chain table including the fourth hash value into the hardware-authentication key.

3. The method according to claim 1, wherein the method further comprises:
   performing operation to an installation time, an installed-module list and an installation address of the cloud platform to obtain unique authentication information of the cloud platform.

4. The method according to claim 3, wherein the method further comprises:
   writing the unique authentication information of the cloud platform into the hardware-authentication key, and associating the unique authentication information of the cloud platform with the unique authentication ID.

5. The method according to claim 1, wherein the comparing with the final hash value in the hash chain table, the unique authentication ID and the unique user ID that are stored in the cloud platform respectively for authentication comprises:

matching the acquired first with data stored in the cloud platform, and in response to the matching succeeding, determining whether the bound unique user ID exists in the first ID that is matched;

in response to the bound unique user ID existing, determining whether the unique user ID is the same as the acquired second ID; and in response to the unique user ID being different from the acquired second ID, stopping the authentication.

6. The method according to claim 5, wherein the comparing with the final hash value in the hash chain table, the unique authentication ID and the unique user ID that are stored in the cloud platform respectively for authentication comprises:

in response to the unique user ID being the same as the acquired second ID, inquiring whether a state of the user is normal; and in response to the state of the user being abnormal, stopping the authentication.

7. The method according to claim 6, wherein the comparing with the final hash value in the hash chain table, the unique authentication ID and the unique user ID that are stored in the cloud platform respectively for authentication comprises:

in response to the state of the user being normal, inquiring whether a hash value of a next node of the first hash value is the same as the final hash value; and in response to the hash value of the next node of the first hash value being the same as the final hash value, passing the authentication, and giving a scope of logging-in according to a permission of the user.

8. A computer device, wherein the computer device comprises:

at least one processor; and a memory, wherein the memory stores a computer instruction that is executable in the processor, and the instruction, when executed by the processor, causes the processor to:

in response to a cloud platform being created, generate a random character string and perform hash operation to the random character string to obtain a first hash value;

in response to creation of a user in the cloud platform, based on current timestamp information and a username character string, perform operation to obtain a unique user identity document (ID);

acquire information of a hardware-authentication key, generate a unique authentication ID according to the information, write the unique authentication ID into the hardware-authentication key as a first ID, write the unique user ID into the hardware-authentication key as a second ID, and bind the unique user ID and the unique authentication ID at the cloud platform;

in response to completion of the creation of the user in the cloud platform, generate a first password and a second password; perform operation to obtain a second hash value based on the first password and the first hash value, and write a hash chain table including the first hash value and the second hash value into the hardware-authentication key;

in response to the hardware-authentication key being inserted into the cloud platform, acquire the hash values in the hash chain table, the first ID and the second ID of the hardware-authentication key, and compare with a final hash value in the hash chain table, the unique authentication ID and the unique user ID that are stored in the cloud platform respectively for authentication;

in response to the authentication being passed, giving a scope of logging-in according to a permission of the user; and in response to the authentication being not passed, not allowing to loci in the cloud platform.

9. A non-transitory computer-readable storage medium, the computer-readable storage medium storing a computer program, wherein the computer program, when executed by a processor, causes the processor to:

in response to a cloud platform being created, generate a random character string and perform hash operation to the random character string to obtain a first hash value;

in response to creation of a user in the cloud platform, based on current timestamp information and a username character string, perform operation to obtain a unique user identity document (ID);

acquire information of a hardware-authentication key, generate a unique authentication ID according to the information, write the unique authentication ID into the hardware-authentication key as a first ID, write the unique user ID into the hardware-authentication key as a second ID, and bind the unique user ID and the unique authentication ID at the cloud platform;

in response to completion of the creation of the user in the cloud platform, generate a first password and a second password; perform operation to obtain a second hash value based on the first password and the first hash value, and write a hash chain table including the first hash value and the second hash value into the hardware-authentication key;

in response to the hardware-authentication key being inserted into the cloud platform, acquire the hash values in the hash chain table, the first ID and the second ID of the hardware-authentication key, and compare with a final hash value in the hash chain table, the unique authentication ID and the unique user ID that are stored in the cloud platform respectively for authentication;

in response to the authentication being passed, giving a scope of logging-in according to a permission of the user; and in response to the authentication being not passed, not allowing to loci in the cloud platform.

10. The method according to claim 1, wherein the hardware-authentication key is a USB-flash-disk-type hardware-authentication key, and its basic structure is a universal serial bus port device.

11. The method according to claim 10, wherein the method further comprises:

reading VID (Vender Identification) &PID (Product Identification), a serial number, manufacturer information, product information and version information of a USB flash disk and connecting by using hyphens, to obtain a unique character string, and performing md5 (Message-Digest Algorithm 5)-value operation, to obtain a uniqueness-ID character string, to identify a uniqueness ID of the USB-flash-disks-type hardware-authentication key ID.

12. The method according to claim 1, wherein a user ID of a created user in the cloud platform employs a 32-bit character-string identifier, and a rule of generating the 32-bit character-string identifier includes:

obtaining a character string of timestamp information of current system time of the cloud platform plus a user name, performing md5 operation, and operating out the 32-bit character string.

13. The method according to claim 1, wherein users and hardware-authentication keys in the cloud platform correspond one to one.

14. The computer device according to claim 8, wherein the instruction, when executed by the processor, further causes the processor to:
in response to the user modifying the first password into a third password, obtain, by the cloud platform, a fourth password according to the third password; and
perform operation to the second hash value and the second password to obtain a third hash value, perform operation to the third hash value and the third password to obtain a fourth hash value, and save the hash chain table including the fourth hash value into the hardware-authentication key.

15. The computer device according to claim 8, wherein the instruction, when executed by the processor, further causes the processor to:
perform operation to an installation time, an installed-module list and an installation address of the cloud platform to obtain unique authentication information of the cloud platform.

16. The computer device according to claim 15, wherein the instruction, when executed by the processor, further causes the processor to:
write the unique authentication information of the cloud platform into the hardware-authentication key, and associate the unique authentication information of the cloud platform with the unique authentication ID.

17. The computer device according to claim 8, wherein compare with the final hash value in the hash chain table, the unique authentication ID and the unique user ID that are stored in the cloud platform respectively for authentication, comprises:
matching the acquired first ID in data stored in the cloud platform, and in response to the matching succeeding, determining whether the bound unique user ID exists in the first ID that is matched;
in response to the bound unique user ID existing, determining whether the unique user ID is the same as the acquired second ID; and
in response to the unique user ID being different from the acquired second ID, stopping the authentication.

18. The non-transitory computer-readable storage medium according to claim 9, wherein the instruction, when executed by the processor, further causes the processor to:
in response to the user modifying the first password into a third password, obtain, by the cloud platform, a fourth password according to the third password; and
perform operation to the second hash value and the second password to obtain a third hash value, perform operation to the third hash value and the third password to obtain a fourth hash value, and save a hash chain table including the fourth hash value into the hardware-authentication key.

19. The non-transitory computer-readable storage medium according to claim 9, wherein the instruction, when executed by the processor, further causes the processor to: perform operation to an installation time, an installed-module list and an installation address of the cloud platform to obtain unique authentication information of the cloud platform.

20. The non-transitory computer-readable storage medium according to claim 19, wherein the instruction, when executed by the processor, further causes the processor to:
write the unique authentication information of the cloud platform into the hardware-authentication key, and associate the unique authentication information of the cloud platform with the unique authentication ID.

* * * * *